United States Patent [19]
Tonn

[11] Patent Number: 6,098,952
[45] Date of Patent: *Aug. 8, 2000

[54] LAPTOP COMPUTER SUPPORT

[76] Inventor: Robb Tonn, 724-240 Graham Avenue, Winnipeg, Manitoba, Canada, R3C 0J7

[ * ] Notice: This patent issued on a continued prosecution application filed under 37 CFR 1.53(d), and is subject to the twenty year patent term provisions of 35 U.S.C. 154(a)(2).

[21] Appl. No.: 08/893,662

[22] Filed: Jul. 11, 1997

[51] Int. Cl.[7] .............................. A47G 29/00; A47G 1/24; A47B 97/04; A47F 7/14
[52] U.S. Cl. ........................ 248/688; 248/919; 248/455; 248/465
[58] Field of Search ..................................... 248/685, 688, 248/455, 463, 465, 919, 923, 917, 918

[56] References Cited

U.S. PATENT DOCUMENTS

| | | | |
|---|---|---|---|
| 2,568,354 | 9/1951 | Moore | 248/448 |
| 2,662,333 | 12/1953 | Bargen | 248/455 |
| 3,095,834 | 7/1963 | Kilen | 248/449 X |
| 3,878,964 | 4/1975 | Fogle | 248/688 X |
| 4,113,212 | 9/1978 | Coriden | 248/455 |
| 4,618,119 | 10/1986 | Powell | 248/456 |
| 4,856,748 | 8/1989 | Obermeyer | 248/688 |
| 5,052,650 | 10/1991 | Beile et al. | 248/456 X |
| 5,503,361 | 4/1996 | Kan-O et al. | 248/688 |
| 5,769,369 | 6/1998 | Meinel | 248/917 X |

*Primary Examiner*—Derek J. Berger
*Assistant Examiner*—David Heisey
*Attorney, Agent, or Firm*—Adrian D. Battison; Murray E. Thrift

[57] ABSTRACT

The laptop computer support is for use in supporting a laptop computer on a top of a desk adjacent an edge of the desk. The laptop computer support supports the laptop computer such that a front end of the laptop computer extends past the edge of the desk to a position just above the lap of an individual sitting at the desk. The laptop computer support has a plate member for engaging a bottom surface of the computer supporting the computer. A flange is fixed at the front end of the plate member and extends laterally across at least a portion of the plate member projecting outwards from the top surface of the plate member. The flange engages the front end of the laptop computer and prevents the computer from sliding forwards and off of the laptop computer support. A leg is connected to the plate member and supports the plate member on the desk top at one of a plurality of angles to the top of the desk, and at least one foot member engages the top of the desk adjacent the edge of the desk. The foot members are attached to the bottom of the plate member adjacent the front of the plate member and are spaced downwards from where the leg is connected to the plate member.

9 Claims, 5 Drawing Sheets

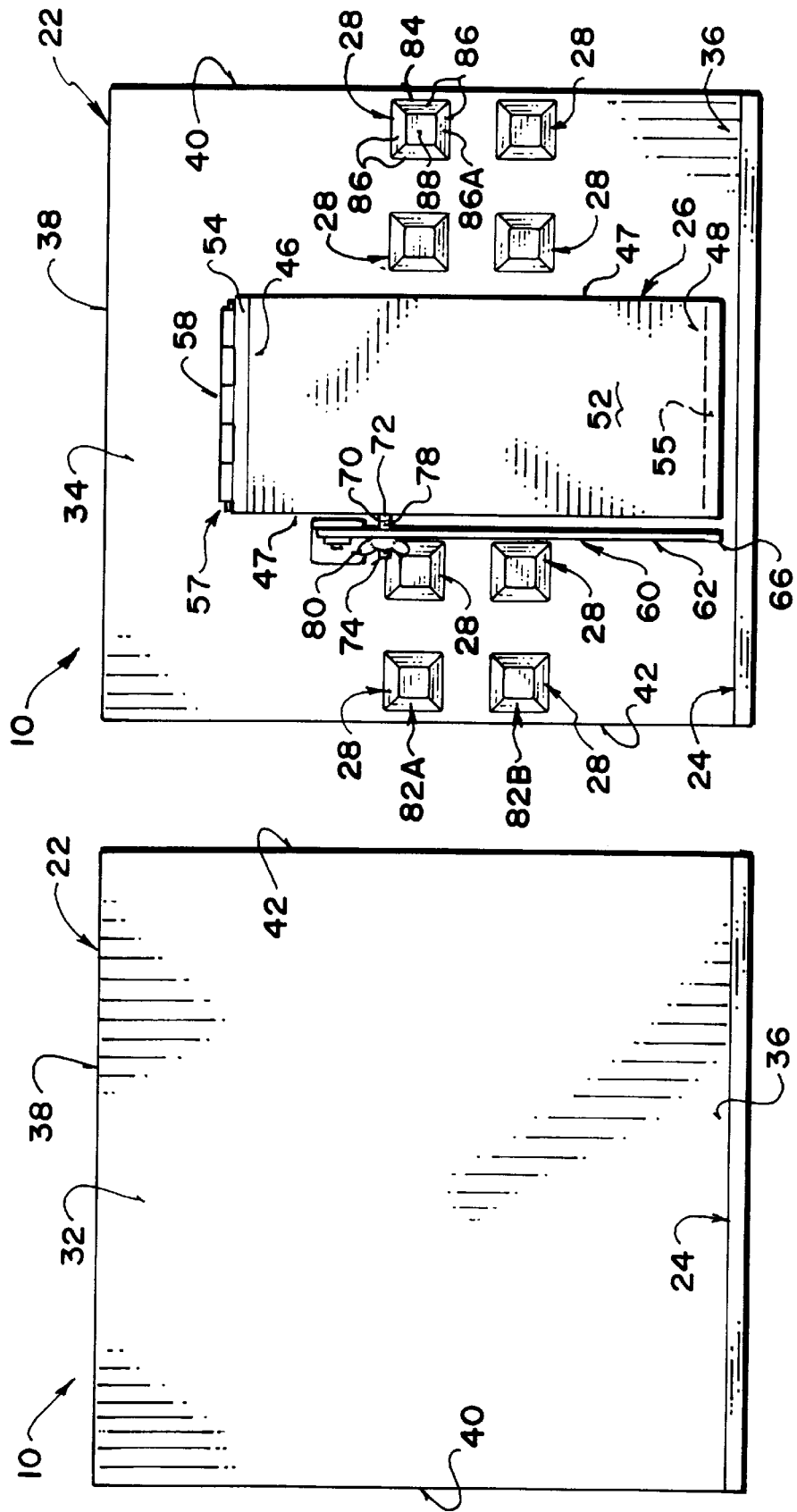

LAPTOP COMPUTER SUPPORT

FIELD OF THE INVENTION

The present invention relates to a support device for supporting a laptop computer, particularly of the type for supporting a laptop computer on a desk at an edge of the top of the desk.

BACKGROUND

As the use of computers increases many individuals use a laptop computer to allow them access to their data both when in the office and when away from the office. Although laptop computers are readily portable they have the disadvantage that they are somewhat awkward to use when sitting and working at a desk or table. Laptop computers are designed for typing with the computer resting in the lap of an individual. When used in this manner typing on the computer keyboard is easy and can be done in a comfortable position. Most laptop computers however are poorly suited for typing when the computer is resting on top of the desk. This is because the position of the keyboard on the laptop computer requires that an individual hold his/her hands in an elevated position while typing with the computer resting on top of the desk. This is quite awkward and can lead to fatigue and possibly to repetitive strain injuries.

To attempt to solve this problem the laptop computer is sometimes positioned so that front of the computer rests in the lap of the individual using it and the rear of the computer is positioned on the edge of the front of the desk top. This lowers the keyboard of the computer and positions it at an angle which makes typing easier. This is a poor solution however since it requires that the computer be balanced precariously between the individual's lap and the desk making it difficult to perform other activities at the desk and in some cases may lead to the computer sliding off of the legs or desk.

SUMMARY OF THE INVENTION

The laptop computer support is for use in supporting a laptop computer on a top of a desk adjacent an edge of the desk. The laptop computer support supports the laptop computer such that a front end of the laptop computer extends past the edge of the desk to a position above the lap of an individual sitting at the desk.

According to one aspect of the present invention there is provided a support device for supporting a laptop computer on a desk at an edge of a top of the desk, said laptop computer having a bottom surface and a front end, said support device comprising:
  a plate member for engaging a bottom surface of the laptop computer supporting said laptop computer, said plate member having a front end, a rear end, a top face, and a bottom face;
  a flange fixed to the plate member adjacent the front end thereof and extending laterally across at least a portion of the plate member and projecting outwards from the top face thereof for engaging the front end of the laptop computer;
  a leg having a first end connected to the bottom face of the plate member adjacent the rear end thereof and a free second end arranged to engage the top of the desk;
  and at least one foot member fixed to the plate member at a location adjacent the front end of the plate member and spaced forwards from the first end of the leg, said at least one foot member being arranged for engaging the top of the desk adjacent the edge of the desk.

Preferably the support device includes an angular adjustment means comprising a pivot connection connecting the first end of the leg member to the bottom face of the plate member such that the leg can be pivoted between a first position arranged to lie adjacent the plate and a second position arranged at an angle to the plate member.

BRIEF DESCRIPTION OF THE DRAWINGS

FIG. 2 is a top view of the support device.

FIG. 3 is a view of the support device.

DETAILED DESCRIPTION

Figure 1:
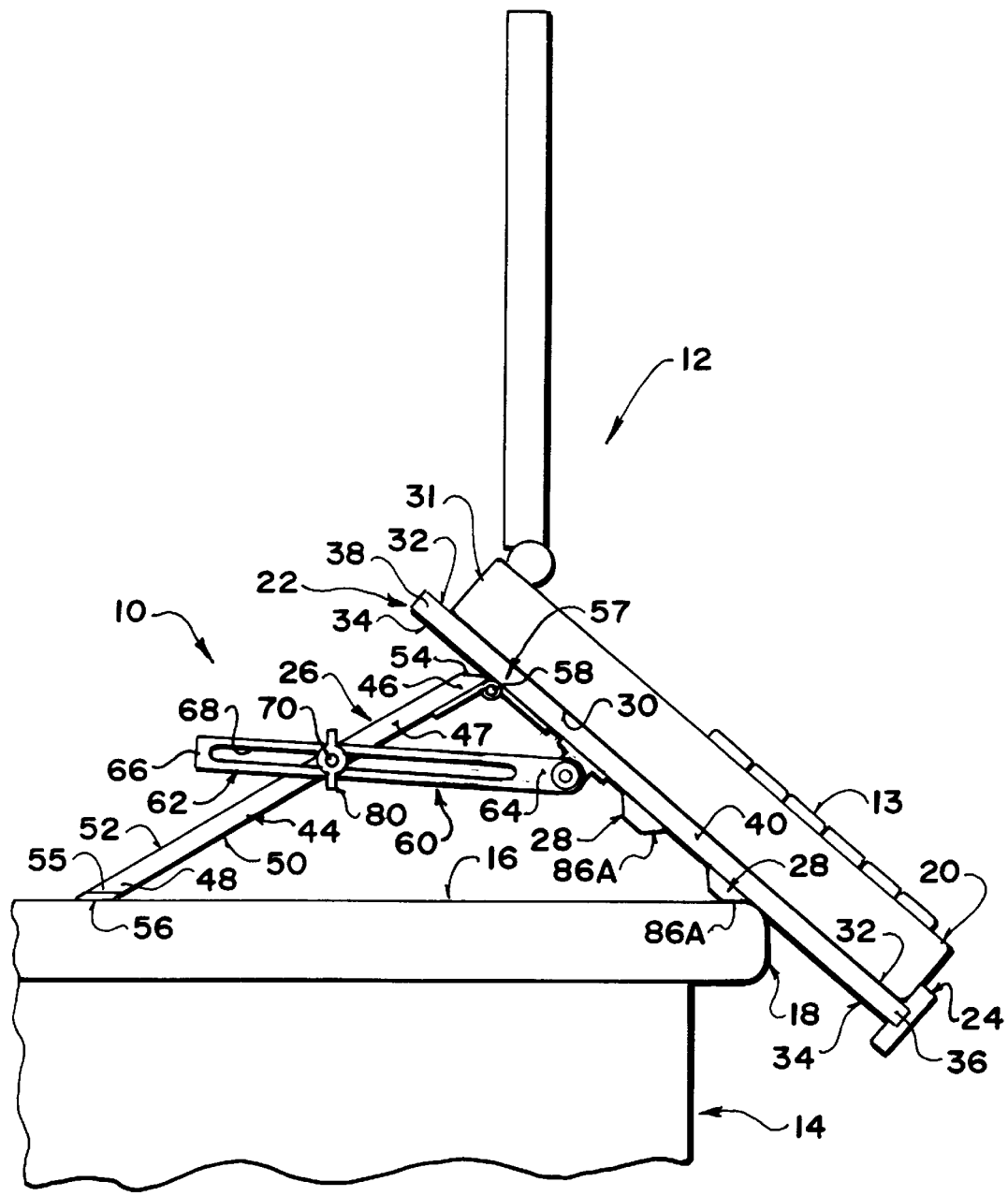
FIG. 1 is a side view of the support device in place on a desk top and supporting a laptop computer.

Referring to FIGS. 1 to 4 the laptop computer support is shown generally at 10. The laptop computer support 10 is for use in supporting a laptop computer 12 on the top 16 of a desk 14 adjacent an edge 18 of the desk 14. The laptop computer support 10 supports the laptop computer 12 such that a front end 20 of the laptop computer 12 extends past the edge 18 of the desk 14 to a position just above the lap of an individual sitting at the desk 14.

The laptop computer support 10 comprises a plate member 22, a flange 24 fixed to the plate member 22, a leg 26 for supporting the plate member 22 at an angle to the desk top 16, and a plurality of foot members 28 fixed to the plate member 22 for engaging the top 16 of the desk 14.

The plate member 22 is roughly square in shape and sized and arranged for engaging a bottom surface 30 of the laptop computer 12 supporting the computer 12. The plate member 22 has a top face 32, a bottom face 34, a front end 36, a rear end 38, and left and right sides 40 and 42. The bottom surface 30 of the laptop computer 12 is received upon the top face 32 of the plate member 22 when the laptop computer 12 is positioned on the laptop computer support 10.

The flange 24 is fixed along the front edge 36 of the plate member 22. The flange 24 is arranged such that it engages a front end 20 of the laptop computer 12 and prevents the laptop computer 12 from sliding downwards and forwards off of the plate member 22 when the support 10 is in place on the desk 14. The flange 24 extends laterally across the entire front end 36 of the plate member 22 and projects outwards from the top face 32 to a free end. The flange 24 engages the entire length of the front side 20 of the laptop computer.

The leg 26 is connected to the plate member 22 and supports the plate member 22 on the desk top 14 at one of a plurality of angles to the top 16 of the desk 14. The leg 26 comprises a substantially rectangular plate 44 having a first end 46 connected to the bottom face 34 of the plate member 22, and a free second end 48 arranged for engaging the top 16 of the desk 14. The leg 26 is arranged to extend laterally across a portion of the bottom face 34 of the plate member 22 and is positioned relatively centrally between the sides 40 and 42 of the plate member 22. The first end 46 of the leg 26 is connected to the plate member 22 at a location near the rear end 38 of the plate member 22 and is spaced a distance forwards of the rear end 38.

The leg 26 includes a first face 50 and a second face 52 and has sloped portions 54 and 55 arranged one at each of the first and second ends 46 and 48 thereof. Each sloped portion 54 and 55 slopes from the first face 50 towards the second face 52 in a direction towards the second end 48. The sloped portion 55 extends laterally across the entire second end 48 of the leg 26. The sloped portion 54 at the first end 46 provides clearance between the first end 46 of the leg 26 and the bottom face 34 of the plate member 22 while the sloped portion 55 at the second end 48 provides an engagement surface for engaging the top 16 of the desk 14.

The second end 48 of the leg 26 also includes a non-slip surface 56 which extends across the sloped portion 55. The non-slip surface 56 helps prevent the laptop support 10 from sliding on the top surface 16 of the desk 14. The non-slip surface 56 comprises a layer of rubber silicone fixed to the second end 48 of the leg 26 which extends across the entire second end 48 of the leg 26. Any other appropriate means of providing a non-slip surface to the second end 48 of the leg 26 may be used as an alternative.

The laptop computer support 10 also includes angular adjustment means 57 for adjusting the angular position of the leg 26 relative to the bottom face 34 of the plate member 22. The angular adjustment means 57 comprise a pivot connection 58 usually a hinge fixed to the first end 46 of the leg 26 and fixed to the bottom face 34 of the plate member 22. The pivot connection 58 extends laterally across a portion of the bottom face 34 of the plate member 22.

A locking mechanism 60 is provided for locking the leg 26 in the desired angular position. The angular adjustment means 57 allow the leg 26 to be pivoted between a first position lying substantially parallel to and adjacent the plate 22 (best shown in FIG. 4) and a second position at an angle to the plate member 42 with the second end 48 arranged for engaging the top 16 of the desk 14 (best shown in FIG. 1). When in the second position the leg 26 lies at an angle of approximately 135—° to the bottom surface 34 of the plate member 22.

The locking mechanism 60 comprises an elongate strut member 62 having a first end 64 pivotally connected to the bottom face 34 of the plate member 22 and a free second end 66. The first end 64 of the elongate strut 62 is attached to the plate member 22 at a location spaced forwards of the first end 46 of the leg 26 and lying laterally of and adjacent one of the sides 47 of the leg 26. A slot 68 extends laterally through the strut 62 and along the length of the strut 62 between positions adjacent the first and second ends 64 and 66. The slot 68 is arranged such that at least a portion of the slot 68 aligns with the side 47 of the leg 26. A pin member 70 is fixed at a first end 72 to the side 47 of the leg 26 adjacent the strut member 62. The pin member 70 extends laterally of the leg 26 and through the slot 68 in the strut 62 to a free second 74. The pin 70 is sized and arranged within the slot 68 such that as the leg 26 is moved between the first and second positions the pin 70 may slide within the slot 68 between positions adjacent the first and second ends 64 and 68 of the strut 62. A thread 78 and nut 80 provide means for securing the pin 70 at a desired one of a plurality of positions along the slot 68. The thread 78 extends along the pin member 70 from the second end 74 and the nut 80 engages the threads 78 thereby securing the strut 62 between the nut 76 and the side 47 of the leg 26 locking the leg 26 in the desired position. Any appropriate means for securing the pin 70 may be used as an alternative to the thread 78 and nut 80.

Two rows of foot members 28 extend laterally across the bottom face 34 of plate number 22. Each row 82A and 82B comprise a plurality of foot members 28 spaced laterally apart and extending across the plate member 22 between the sides 40 and 42 of the plate member 22. The rows 82A and 82B of foot members 28 are spaced apart from one another and are arranged at locations lying between the front edge 36 of the plate member 22 and the pivot connection 58.

Each one of the foot members 28 is frusto conical in shape having a base 84, sloped sides 86, and an end 88. The end 88 is smaller than the base 84 and the sides 86 slope upwards and inwards from the base 84 to the end 88. Each foot member 28 is fixed to the bottom face 34 of the plate 22 at its base 84 and extends downwards and outwards therefrom to the end 88. The sides 86 and/or the end 88 of each foot member 82 may engage the desk 14. The frusto conical shape of the foot member 28 allows more of the foot member 28 to engage the top surface 16 of the desk 14. To facilitate this the sloped sides 86 are sloped at an angle selected to position the side 86 such that it lies substantially parallel to the top surface 16 of the desk 14 when the leg 26 is positioned with the contact surface 55 of the second end 48 of the leg 26 arranged to lie substantially parallel to the top surface 16 of the desk 14.

Each foot member 28 includes a non-slip surface along the side 86A which is arranged to engage the top 16 of the desk 14. In the embodiment illustrated each foot member 28 is made a rubber silicone material which provides the non-slip surface for engaging the desk 14.

Each row 82A and 82B of foot members 28 is arranged at a position spaced rearwards from the front edge 36 of the plate member 22. The rows 82A and 82B are positioned such that with the leg 26 extended and the second end 48 engaging the top 16 of the desk 14 that each foot member 28 in the row engages the top 16 of the desk 14 at a position adjacent the edge 18 of the desk 14 so that a front portion of the plate member 22 extends past the edge 18 of the desk 16 and below the top 16 of the desk 14. The two rows 82A and 82B allow the individual using the laptop computer support 10 to position the support 10 at one of two positions on the desk 14 and thus the computer keyboard 13 at a comfortable position for typing. The non-slip surfaces 56 and 86A at the second end 48 of the leg 26 and on each foot member 28 respectively, reduce the risk that the laptop computer support 10 will slide forwards and off of the desk 14.

In an alternative arrangement any appropriate number of rows of foot members 28 may be employed.

In another alternative arrangement the non-slip surface of each foot member 28 may be provided by a layer of rubber silicone fixed to the side 86A of each foot member 28.

In another alternative arrangement a single elongate foot member extending laterally across the plate member 22 may replace the plurality of foot members 28 in each row.

In yet another alternative arrangement any appropriate number of foot members may extend laterally across the plate member 22 in each row.

In another alternative arrangement the flange 24 may be arranged to extend laterally along only a portion of the front edge 36 of the plate member 22 and may be discontinuous.

In another alternative arrangement the laptop computer support 10 lacks the plate member 22. The hinge 58 of the angular adjustment means and the foot members 28 are fixed to the bottom surface 30 of the laptop computer 12 instead of to the plate member 22.

Figures 4, 6:
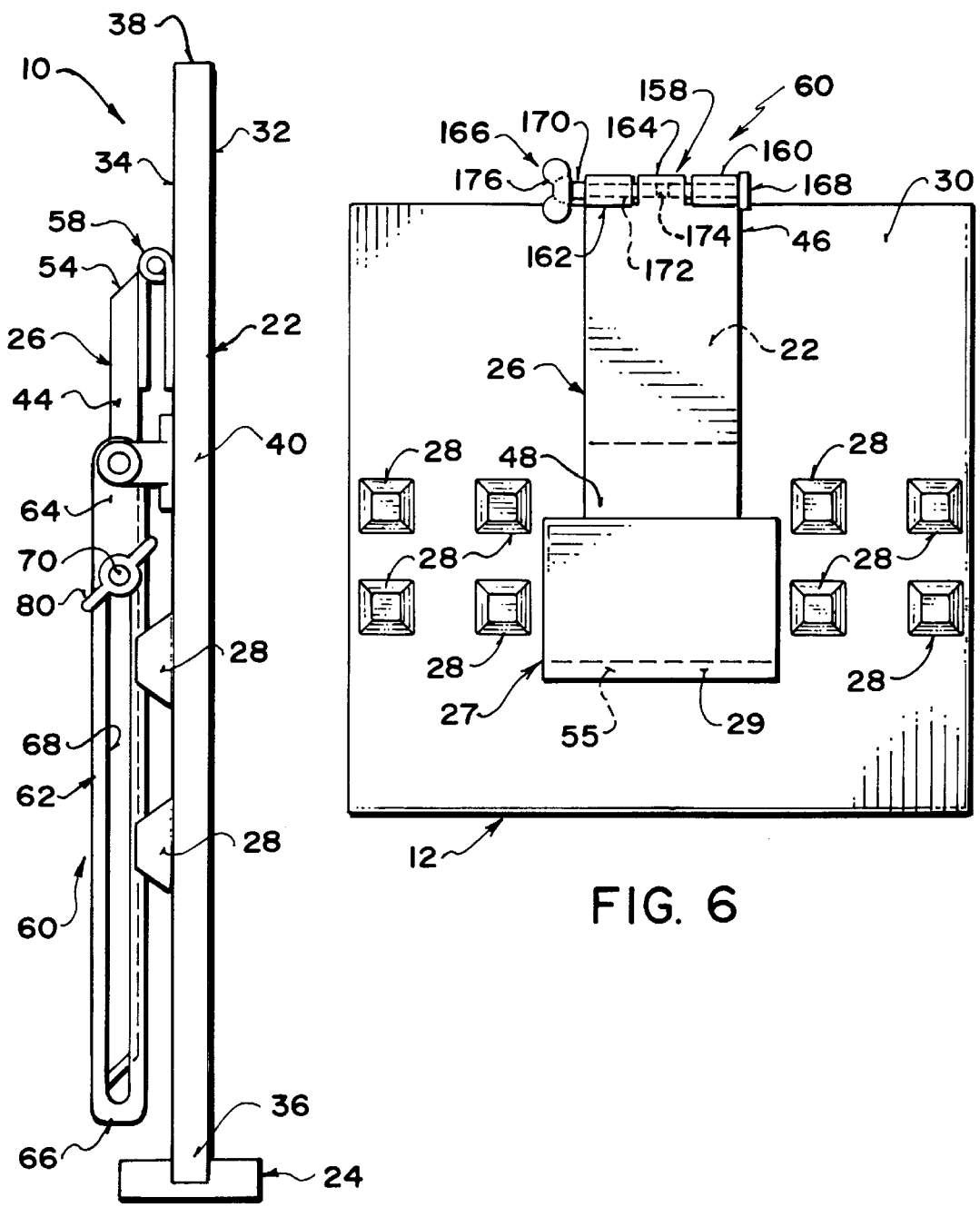
FIG. 4 is a side view of the support device.
FIG. 6 is a top view of the alternative arrangement support device.
Figure 5:
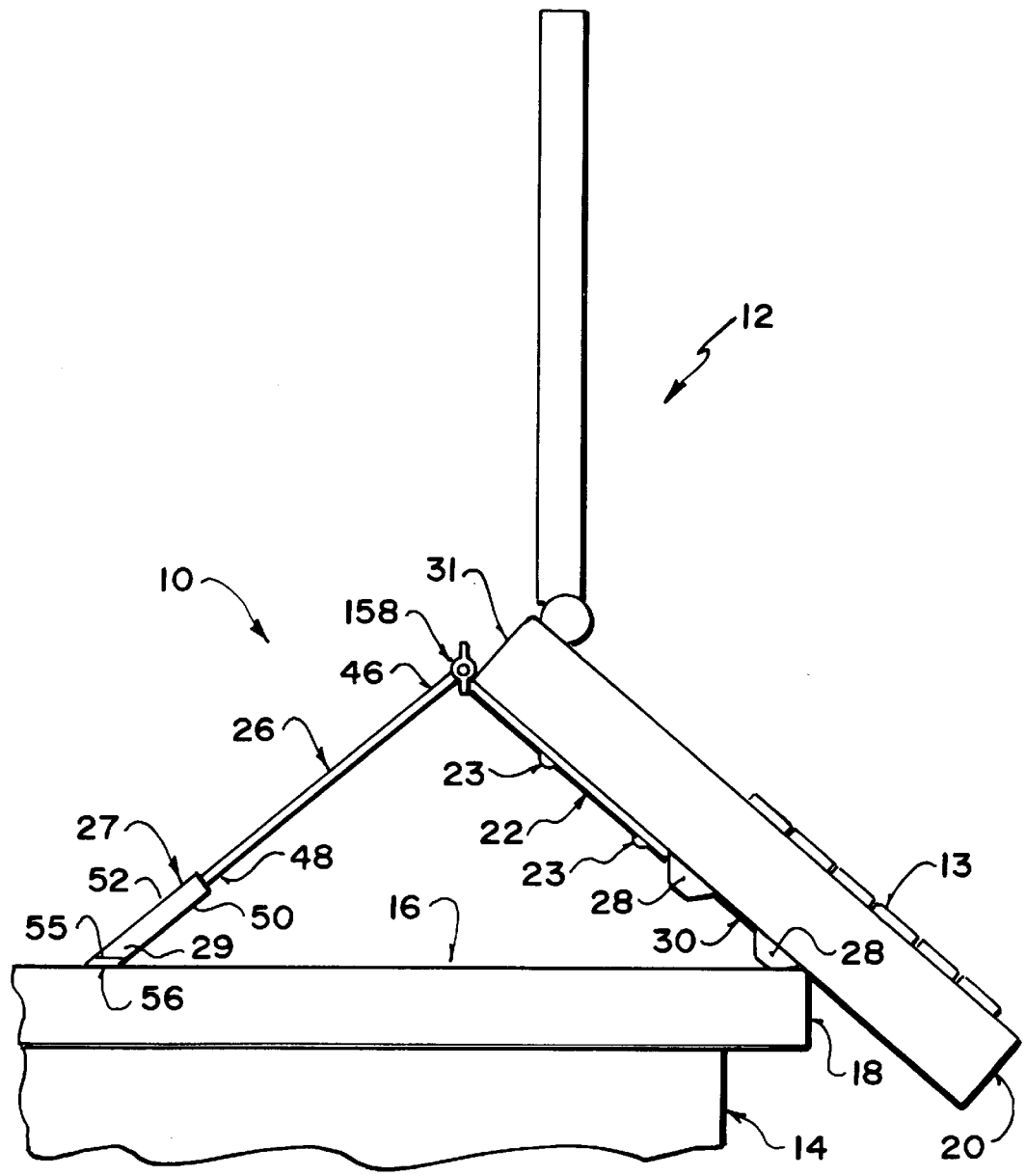
FIG. 5 is a side view of an alternative arrangement of the support device in place on a desk top and supporting a laptop computer.

A further alternative arrangement of the laptop computer support 10 is shown in FIGS. 5 and 6. In this arrangement the plate member 22 is of thin sheet material and is fixed by fasteners 23 to the bottom surface 30 of the laptop computer 12 adjacent the rear 31 of the laptop computer 12. Since the plate member 22 is fixed to the laptop computer 12 it can not slide relative to the plate member 22 and therefor the flange 24 is not required.

In another alternative arrangement the leg 26 is of thin sheet material and includes a foot 27 at the second end 48 thereof. The foot 27 is thicker than the leg 26, extends laterally of the leg 26, and includes the sloped portion 55 at the end 29 of the foot 27. The sloped portion 55 extends laterally across the entire end 29 of the foot 27.

Another alternative arrangement of the locking mechanism 60 is shown in FIG. 6. In this arrangement the locking mechanism 60 comprises a modified hinge 158. The hinge 158 is fixed to the first end 46 of the leg 26 and to the plate member 22. The hinge 158 comprises first and second outer rotatable sleeve sections 160 and 162, an inner rotatable sleeve section 164 arranged between and aligned with the outer sleeve sections 160 and 162 and a two part pin 166 arranged to extend through the rotatable sleeve sections 160, 162, and 164

The rotatable sleeve sections 160, 162, and 164 are aligned with one another and are arranged such that the two outer rotatable sleeve sections 160 and 162 are fixed to either the first end 46 of the leg 26 or the plate member 22, while the inner rotatable sleeve section 164 is fixed to the other of the first end 46 of the leg 26 or the plate member 22.

The two part pin member 166 comprises a first pin section 168 and a second pin section 170 arranged to extend through said rotatable sleeve sections. The first pin section 168 has a first end and a second end and extends from the first end through the first outer sleeve section 160 to the second end lying within the inner sleeve section 164. The first pin section 168 is fixed to the first outer sleeve section 160 such that the inner sleeve section 164 may rotate relative to the first outer sleeve section 160.

The second pin section 170 extends through the second outer sleeve section 162 into the inner sleeve section 164 from a direction opposite the first pin section 168. The second pin section 170 has a first end and a second end and extends from the first end through the second outer sleeve section 16.2 in a direction opposite the first pin section 168 to the second end lying within the inner sleeve section 164 and being arranged such that the inner sleeve section 164 can be rotated relative to the second outer sleeve section 162 and to the inner sleeve section 164.

An external thread 172 extends along the second pin section 170 to the second end thereof. An internal thread 174 is arranged within the inner rotatable sleeve section 164 for receiving the external thread 172 of the second pin section 170. A hand actuating means 176, for example a butterfly nut, is fixed to a first end of the second pin section 170. Turning the hand actuating means 176 in a first direction causes the external thread 172 of the second pin 170 to engage the internal thread 174 of the inner sleeve section 164 drawing the inner sleeve section 164 into contact with the second outer sleeve section 162 thereby locking the hinge 158 and the leg 26 in a desired position. Turning the hand actuating means 176 in a second direction causes the external thread 172 of the second pin 170 to engage the internal thread 174 of the inner sleeve section 164 moving the inner sleeve section 164 away from contact with the second outer sleeve section 162 thereby unlocking the hinge 158 and allowing the leg 26 to be easy moved to a desired position.

A further alternative arrangement the laptop computer support 10 does not include a plate memebr 22 and the foot members 28 and modified hinge 158 are fixed to the first end 46 of the leg 26 and to the bottom surface 30 of the laptop computer 12.

Figure 7:
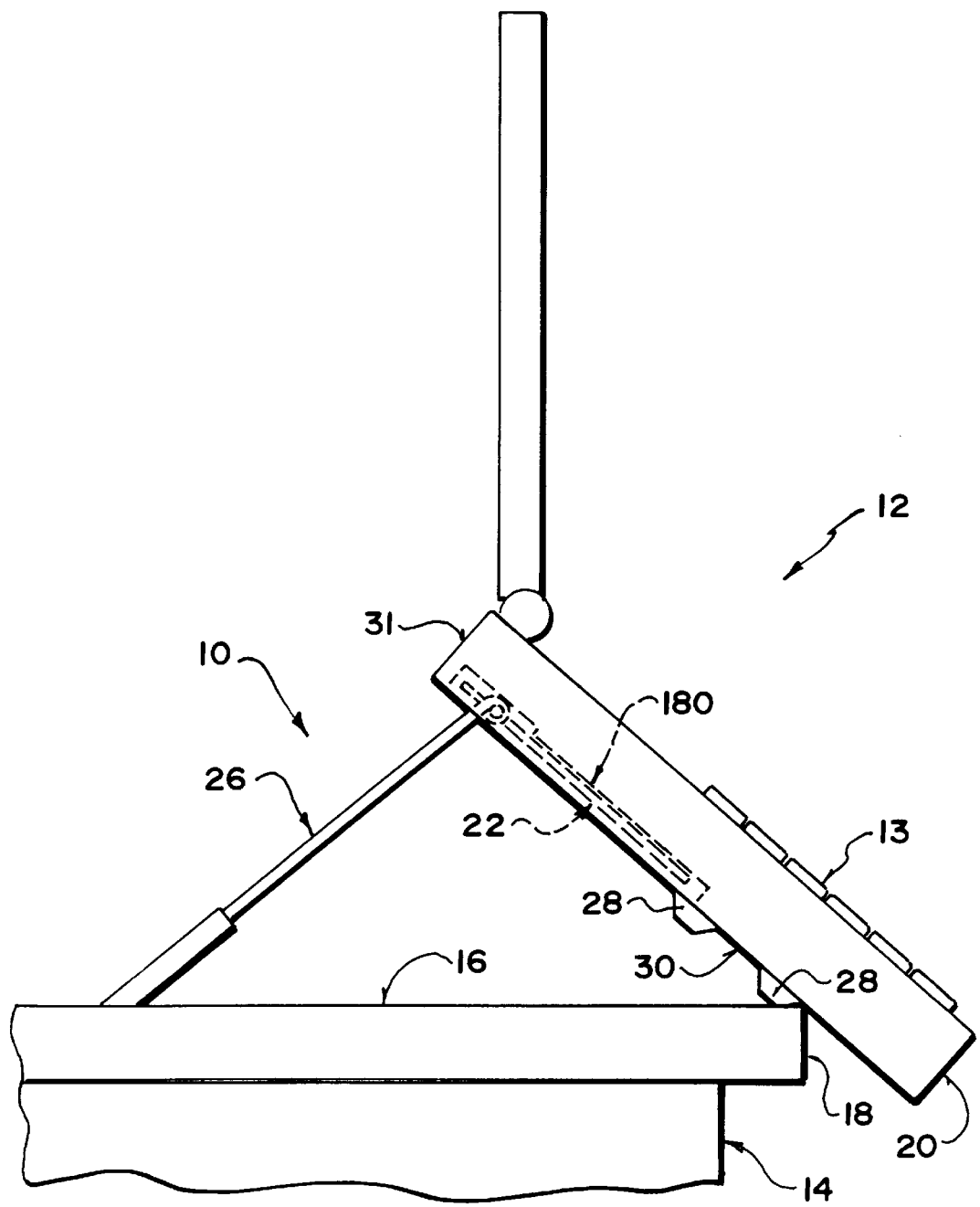
FIG. 7 is a side view of another alternative arrangement of the support device in place on a desk top and supporting a laptop computer.

In yet another alternative arrangement of the plate member 22 is shown in FIG. 7. In this arrangement a recess 180 is arranged in the bottom surface 30 of the laptop computer 12. The recess 180 houses the laptop computer support 10 when not in use.

While one embodiment of the present invention has been described in the foregoing, it is to be understood that other embodiments are possible within the scope of the invention. The invention is to be considered limited solely by the scope of the appended claims.

I claim:

1. A method of mounting a laptop computer on a desk at an edge of a top of the desk, the method comprising:

providing a laptop computer having a bottom surface, a front end for facing a user when operating the laptop computer and a rear end for facing away from the user;

providing a leg mounted relative to the laptop computer to define a first end adjacent the rear end of the laptop computer and a free second end, the leg being pivotal at the first end between a folded position generally parallel to the bottom surface and an extended position in which the leg extends away from the bottom surface for engagement of the free end with the top of the desk to support the rear end away from the top of the desk, and providing at least one foot member fixed relative to the laptop computer at a location thereon spaced forwards from the first end of the leg and adjacent to but spaced rearwardly from the front end of the laptop computer by an overhang distance and locating the foot member on the top of the desk;

mounting a side abutment surface of the at least one foot member on the top of the desk at the edge in contact with the edge such that the front end of the laptop computer and an overhanging portion of the bottom surface of the laptop computer forwardly of the at least one foot member overhang the front edge of the desk and such that the laptop computer is supported on the desk by the support device by contact solely by the leg and the at least one foot member on the desk.

2. The method according to claim wherein the leg and the at least one foot member are mounted directly on the bottom surface of the laptop computer.

3. The method according to claim 1 wherein the leg includes laterally spaced apart sides and a fold locking mechanism comprising:

an elongate strut having a first end pivotally attached to the computer, said first end being attached at a location spaced from the first end of the leg and lying laterally of and adjacent the leg;

a slot extending laterally through the strut and longitudinally therealong, said slot being arranged such that at least a portion of the slot aligns with the leg;

a pin member having a first end and a second end and being fixed at the first end to one side of the leg and extending laterally of the leg through the slot in the strut;

and means for securing the pin member in the slot at a selectable one of a plurality of positions along the slot thereby locking the leg in one of a plurality of angular positions relative to the plate member.

4. The method according to claim 3 wherein the means for securing comprise a thread extending along the pin member from the second end thereof and a nut for engaging the thread thereby securing the strut between the nut and the side of the leg.

5. The method according to claim 1 wherein the at least one foot member comprises a plurality of foot members arranged in a row extending laterally across the laptop computer.

6. The method according to claim 1 wherein the at least one foot member comprises a plurality of foot members arranged in a plurality of rows extending laterally across the laptop computer with each row containing a plurality of the foot members, the rows being spaced rearwardly at different distances from the front end of the laptop computer such that the user can select one of the rows for engaging the edge of the top of the desk for varying the length of the overhanging portion.

7. The method according to claim 1 wherein the at least one foot member is shaped to define a base parallel to the bottom surface of the laptop computer and an end parallel to the base and spaced away from the bottom surface with the side abutment surface defined between the base and the end.

8. A combination of a laptop computer and a support device for supporting the laptop computer on a desk at an edge of a top of the desk, the combination comprising:

the laptop computer having a bottom surface, a front end for facing a user when operating the laptop computer and a rear end for facing away from the user;

and the support device including:

a leg arranged so as in use to be mounted relative to the laptop computer to define a first end adjacent the rear end of the laptop computer and a free second end, the leg being pivotal at the first end between a folded position generally parallel to the bottom surface and an extended position in which the leg extends away from the bottom surface for engagement of the free end with the top of the desk to support the rear end away from the top of the desk;

and a plurality of transverse foot members each arranged so as in use to be fixed relative to the laptop computer at a location thereon spaced forwards from the first end of the leg and adjacent to but spaced rearwardly from the front end of the laptop computer by an overhang distance, with the overhang a distances of the foot members being different, each foot member having a side abutment surface arranged to sit on the top of the desk at the edge in contact therewith such that the front end of the laptop computer and an overhanging portion of the bottom surface of the laptop computer forwardly of the at least one foot member overhang the front edge of the desk and such that the laptop computer is supported on the desk by the support device by contact solely by the leg and the foot member on the desk and such that the user can select one of the transverse foot members for engaging the edge of the top of the desk for varying the length of the overhanging portion.

9. A combination of a laptop computer and a support device for supporting the laptop computer on a desk at an edge of a top of the desk, the combination comprising:

the laptop computer having a bottom surface, a front end for facing a user when operating the laptop computer and a rear end for facing away from the user;

and the support device including:

a leg arranged so as in use to be mounted relative to the laptop computer to define a first end adjacent the rear end of the laptop computer and a free second end, the leg being pivotal at the first end between a folded position generally parallel to the bottom surface and an extended position in which the leg extends away from the bottom surface for engagement of the free end with the top of the desk to support the rear end away from the too of the desk;

and at least one foot member arranged so as in use to be fixed relative to the laptop computer at a location thereon spaced forwards from the first end of the leg and adjacent to but spaced rearwardly from the front end of the laptop computer by an overhand distance, the at least one foot member having a side abutment surface arranged to sit on the top of the desk at the edge in contact therewith such that the front end of the laptop computer and an overhanging portion of the bottom surface of the laptop computer forwardly of the at least one foot member overhang the front edge of the desk and such that the laptop computer is supported on the desk by the support device by contact solely by the leg and the at least one foot member on the desk wherein the side abutment surface is inclined relative to the bottom surface of the computer and to the front end of the computer at an angle so as in use to lie substantially flat on the desk top.

* * * * *